United States Patent [19]
Ahrens

[11] Patent Number: 5,472,101
[45] Date of Patent: Dec. 5, 1995

[54] SKI SECURITY SYSTEM

[76] Inventor: Christian R. Ahrens, 6810 S. Brookhill Dr., Salt Lake City, Utah 84212

[21] Appl. No.: 180,625

[22] Filed: Jan. 13, 1994

[51] Int. Cl.⁶ .................................................. A47F 5/00
[52] U.S. Cl. .............................. 211/70.5; 211/4; 211/182; 211/189; 70/58; 70/18
[58] Field of Search ................................ 211/22, 70.5, 4, 211/182, 189, 206, 191; 70/16, 18, 58, 62, 30, 49

[56] References Cited

U.S. PATENT DOCUMENTS

| | | | |
|---|---|---|---|
| 3,063,571 | 11/1962 | Stempler | 211/206 |
| 3,164,256 | 1/1965 | Bennett | 211/70.5 |
| 3,338,422 | 8/1967 | Hickok | 211/70.5 |
| 3,394,790 | 7/1968 | Braun | 211/70.5 X |
| 3,636,739 | 1/1972 | Smedley | 70/58 |
| 3,685,667 | 8/1972 | Bell | 211/70.5 |
| 4,057,983 | 11/1977 | Morgan | 70/58 X |
| 4,171,079 | 10/1979 | Dietlein et al. | 70/58 X |
| 4,683,729 | 8/1987 | Rogers | 70/58 |
| 4,956,982 | 9/1990 | Valley | 70/18 X |

FOREIGN PATENT DOCUMENTS

| | | | |
|---|---|---|---|
| 726005 | 1/1966 | Canada | 211/206 |
| 109240 | 3/1900 | Germany | 211/4 |
| 179297 | 11/1935 | Switzerland | 211/70.5 |

*Primary Examiner*—Robert W. Gibson, Jr.
*Attorney, Agent, or Firm*—Berne S. Broadbent; A. John Pats; Gary D. E. Pierce

[57] ABSTRACT

A ski security system includes a moveable rack for supporting pairs of skis when not it use. The rack is formed of two tubular members of galvanized steel tubing each bent in a single piece to form a leg portion at each end with an intermediate transverse portion therebetween. In service, each transverse portion extends between the tops of the two respective leg portions, which are themselves attached to the opposite two legs of the other tubular member. The transverse members are spaced apart from one another to form a yoke for carrying. The racks are stackable for storage, and light enough to be moved to an inside storage location daily. Each leg portion is bent to form a knee portion located proximate the top thereof and near the transverse portion. The two tubular members are joined at each end, being connected at the respective knee portion of each, the legs extending away therefrom upward and downward as well as outward. The transverse portion of each tubular member is provided with a continuous filament formed into alternating slots and loops. Slots receive standing skis leaned against the transverse member. Loops receive a locking mechanism to secure the skis to the rack. The locking mechanism may be permanently or temporarily attached to the loops, and is adjustable to snugly fit different types of skis.

19 Claims, 14 Drawing Sheets

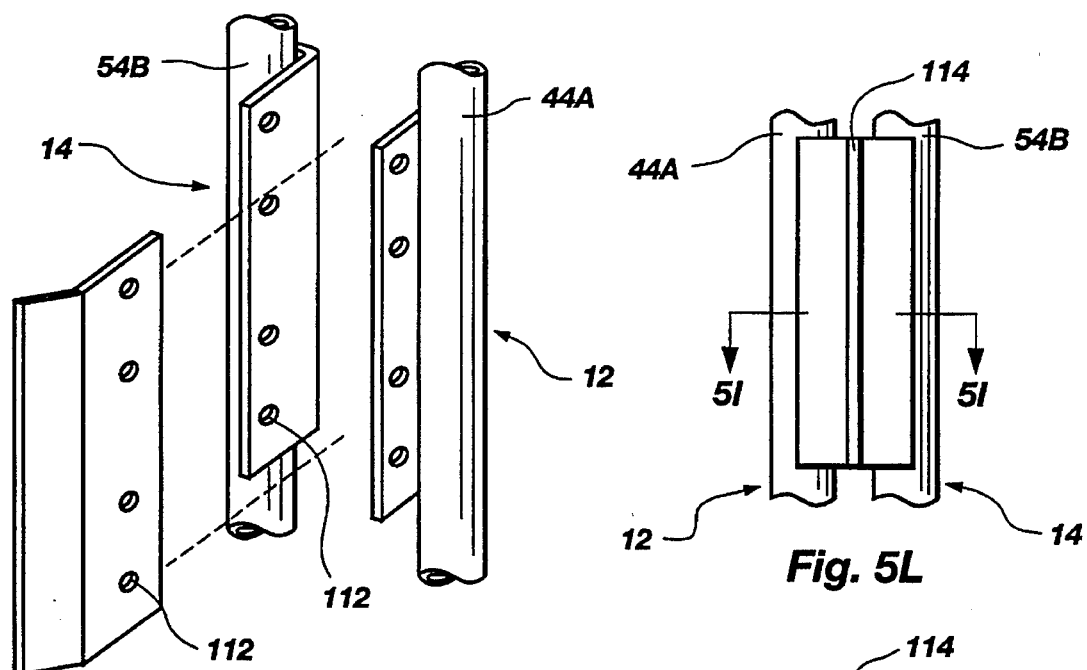
*Fig. 5J*
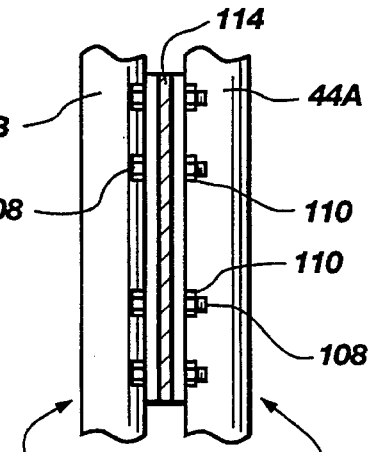
*Fig. 5L*
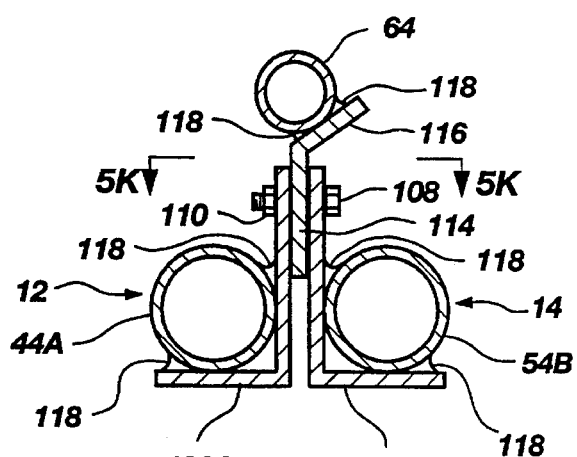
*Fig. 5I*
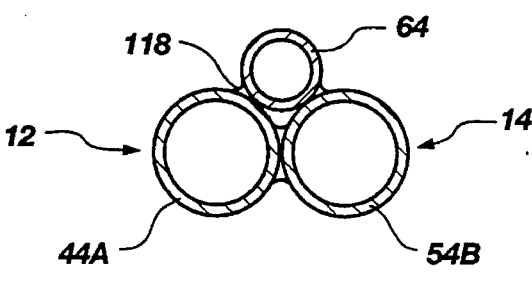
*Fig. 5K*
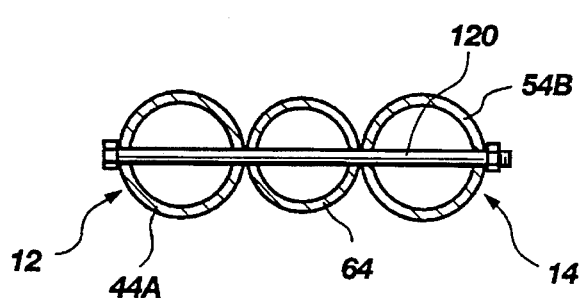
*Fig. 5N*
*Fig. 5M*

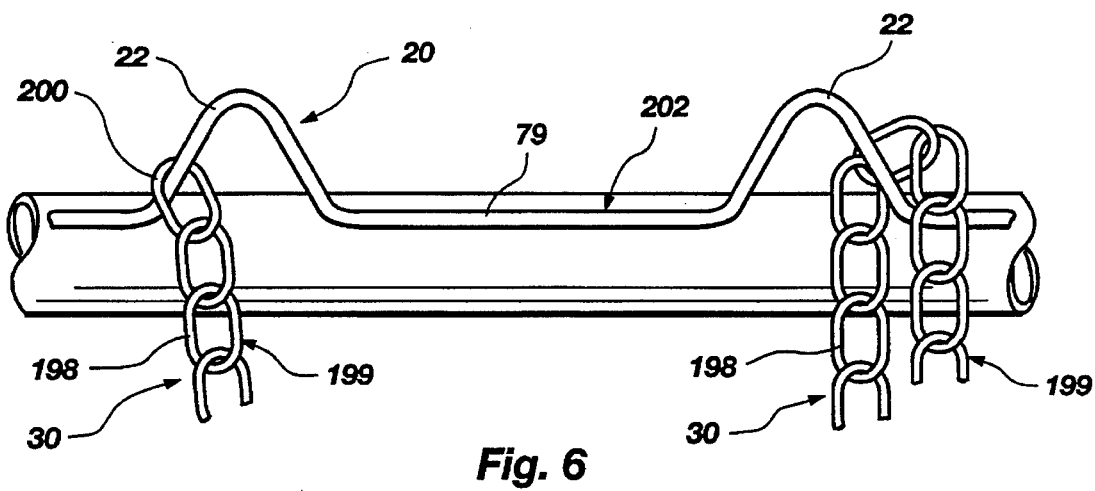
Fig. 6
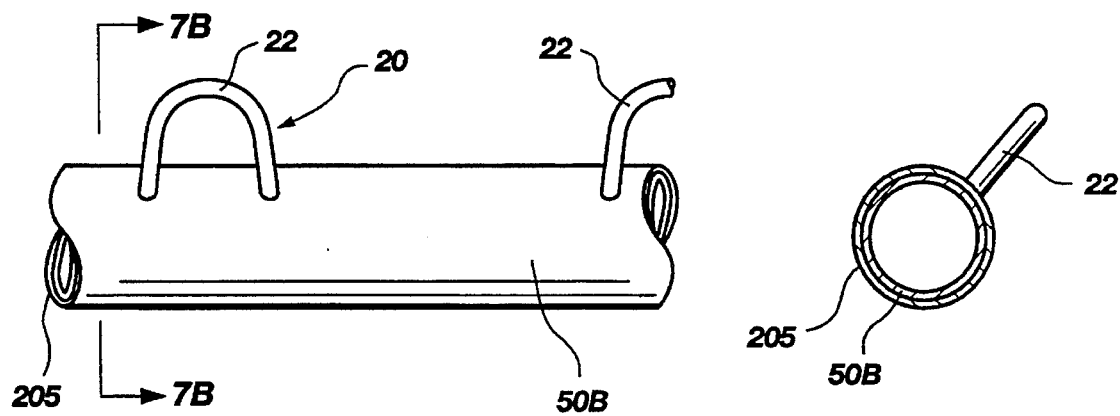
Fig. 7A
Fig. 7B

SKI SECURITY SYSTEM

BACKGROUND OF THE INVENTION

1. Field of the Invention

The invention pertains generally to equipment for securely holding skis when not in use and more particularly to stationary ski racks with locking mechanisms.

2. State of the Art

Ski racks are constructed for both stationary and moveable platforms. Car-top carriers adapted to hold skis are known in the art, as are racks designed to fit inside and outside of buses servicing ski resorts. Likewise, in or on tramways and other ski lifts, racks are sometimes provided for holding the skis of patrons.

Stationary ski tacks are typically provided by a ski lodge operator or ski lift operator in proximity to a lodge where skiers may test, eat, purchase accessories and equipment, or rent equipment. Most merchants and ski area operators with a need to provide a location for temporary storage of patrons' skis, simply build a rack of wood.

Racks are heavy and often immoveable, being permanently anchored to the ground or a wall. Some racks are put out on the ground at the beginning of a ski season. Even these supposedly temporary or seasonal racks often become immoveable after the initial few snowfalls of a season. To remain moveable, such racks must be moved daily by a crew of two or more husky workers dedicated to the task at the end of each day.

Snow pack above the base of a ski rack or ice around the base typically will make a ski rack a permanent fixture until the ski season's end. During the season, wood of a rack left outdoors becomes wet and heavy, weathers, splinters and otherwise submits to the ravages of the elements.

Meanwhile, snow accumulation often builds up to become several feet deep under the ski rack. This buildup not only fixes the rack in place but makes it less useful by reducing the effective height of the rail above a support surface such as the ground.

What is needed is a ski rack that can be moved daily. Ideally, the rack should be manageable by a single individual at the end of a day, to reduce crew size. Such portability requires relatively light weight. The rack should be impervious to weather, and should have means to anchor some type of tether or lock. The rack should even be storable indoors, stacking, if possible, with other identical racks.

Another difficulty with ski racks is the inability to secure skis to the racks. Because racks are large or may be simply a wall, no secure place exists to which a lock can be conveniently and securely anchored.

Locks are likewise problematic, given the large variety in ski sizes and binding configurations. That is, most ski locks depend on capturing the waist of a ski, between the front and rear binding hardware. Rigid and flexible locking mechanisms may each be loose or tight, depending on the size of the ski waist. Excessive space may reduce the effectiveness of the lock.

Even cables which can be wrapped around skis to take up slack, must be wound around the skis an integral number of times. Any slack is subject to being worked until it can be slipped over the ski bindings, thus permitting release of each wrap in turn over the binding.

Another difficulty is weight. Ski locks are often carried by the skier while skiing so as to be ready for easy access when needed. Space is a similar concern since excess bulk is undesirable, with strength a balancing consideration.

What is needed is a ski security system having a portable rack having a locking mechanism configured to be permanent, and adaptable to be removable. The lock should be simply and easily attachable to a variety of types of skis, regardless of size and regardless of the style of bindings. Thus, the rack and lock of the ski security system should be a secure place for locating skis while a skier is elsewhere.

The lock should be readily operable without a tangle of cables and fasteners. Each lock should preferably be unique or of a limited number of its key or release type. The lock should be releasable only by the individual user or the owner.

SUMMARY

The invention assists in meeting these needs by providing a moveable ski rack, sufficiently light and balanced to be lifted completely off the ground by a single person. Deployed on a horizontal support surface, the ski rack is open at its center of mass about a vertical axis. The rack has lateral members, also called transverse members or beams, for fitting over the shoulders of a user. A person moving the rack may balance the beams on the shoulders as a yoke. The head of a user carrying the rack is positioned between and above the two lateral members, for visibility and comfort. Thus, the rack can be completely balanced on the shoulders of a single individual for ease and comfort of movement of the rack.

In one embodiment, the invention includes a rack for supporting skis standing on end. The skis are typically fastened together or placed with their sliding surfaces together, before being positioned with the tails on a support surface. A support surface may be a deck, a floor, the ground or snow. In use, the support surface will usually be the accumulated snow pack near the lodge of a ski resort.

The rack comprises a first tubular member connected to a second tubular member. The first tubular member comprises a first leg having a proximal end positionable on a support surface. A first transverse member is connected at one end to a distal end of the first leg. A second leg has a proximal end positionable on a support surface and extending to connect at a distal end to another end of the first transverse member.

A second tubular member is connected to the first tubular member and may be effectively identical thereto. The second tubular member comprises a third leg having a proximal end positionable on a support surface. A second transverse member is connected at one end to a distal end of the third leg.

A fourth leg has a proximal end positionable on a support surface and extending to connect at a distal end to another end of the second transverse member. The first and second tubular members are connected to position the first and second transverse members in spaced apart relation. Sufficient space is available between the two transverse members to permit the head of a user to pass between the two transverse members.

The two transverse members thus form a yoke positionable on the shoulders of a user. A user moves to place the rack over the shoulders, and rises to place the middle of each transverse member on one shoulder. As the user stands up straight, the rack is lifted for carrying.

In one embodiment, the rack's first and second tubular members are positionable to be balanced on the shoulders of a single user. The rack may also be constructed to have the first and second transverse members each provided with retainers effective to separate pairs of skis leaned thereagainst. The retainers are further provided with loops for receiving locks therethrough effective to secure a pair of skis against removal therefrom.

In one embodiment of the rack, the first leg and second leg are each formed to have a knee therein. The third and fourth legs are likewise each formed to have a knee portion formed therein. The first leg is fixed to the fourth leg and the second leg is fixed to the third leg. Preferably, the first leg is fastened at the knee portion thereof to the fourth leg at the knee portion thereof. Similarly, the second leg is fastened at the knee portion thereof to the third leg at the knee portion thereof.

The tubular members are preferably formed of a lightweight material resistant to deterioration. In one embodiment, the tubular members may be formed of a plastic-like material. Fiber-reinforced epoxies, filament wound fiberglass in an epoxy or polyester matrix, polyethylene and graphite reinforced resin are all considered appropriate materials for the tubular members.

The tubular members are most economically formed of steel tubing. The steel functions best given a coating effective to resist deterioration in an outdoor environment. Suitable coatings include cathodic coatings such as nickel, paint, vinyl dipping, polymer powder coating and the like. Also, zinc is found to work satisfactorily as an anodic coating.

A lock is provided as part of the security system for securing a pair of skis to a fixed anchor. The fixed anchor may be a loop on one of the transverse members of the rack.

The lock comprises a frame sized for receiving a pair of skis. A hasp is rotatably connected at one end to a first end of the frame. The hasp rotates freely in a first direction toward closure with the frame. The hasp is preferably free to rotate a full 360 degrees continuously with no more than nominal resistance. The hasp is also sized with the frame to surround a pair of skis therebetween.

A tether connects at a proximal end thereof to the frame. The tether is configured to extend away from the frame. At the distal end of the tether a ring is attached, sized to receive the hasp therethrough. A catch is secured to the frame to selectively engage another end of the hasp against movement in a direction opposite the first direction. The catch is preferably a ratchet mechanism, releasable by an actuator. Thus, the catch can be selectively released, to release the hasp. Meanwhile, the hasp can be rotated in the first direction to provide a snug fit around skis of virtually any size.

The tether may be a chain, but a cable may be made to work in some circumstances. A cable must have a loop in one end, formed of the cable clamped to itself or formed of a separate, strong piece secured to the cable end. If the tether is a cable, care may be taken to provide a sheath to prevent grease and steel shavings from the cable from soiling clothing. Also, the cable should be of sufficient hardness to prevent cutting. Moreover, the cable may be sized to be strong and thick, but to be coilable in a pocket. At the same time, the cable should not be so stiff as to be unmanageable or inconvenient.

The hasp in one embodiment is formed to pass through the frame in the first direction. In the alternative, the hasp may be formed to pass by the frame in the first direction. Thus, the frame may be in two halves with a hasp passing therebetween, or the frame may be similar to the hasp, with an engagement system positioned between the adjacent surfaces of the hasp and frame to stop relative movement thereof.

The catch may be a ratchet to permit the lock to be snugged down against the skis. Also, a user may choose to lock ski poles by the straps thereof or by shafts thereof in the lock with the skis. Thus, the user benefits by the ability of the ratchet to be adjusted for ski size and for poles. The ratchet is selectively releasable to permit movement in a direction opposite the first direction. Thus, the lock can be cinched down tight according to the amount of equipment captured between the frame and the hasp, but is releasable by opening the ratchet.

The ratchet may be released by pulling the engaged portions, such as mating teeth, apart or by removing a bar or similar fitted element from the engaging teeth held thereby. Similarly, matched teeth may be moved apart by removing a bias on springs behind the teeth urging the teeth into engagement.

The ring from the tether may be permanently welded together around the loop of the rack to become a permanent part of the rack. Thus, the lock may be assignable like a locker. In another embodiment, the lock may be removable.

Thus a ski security system for temporarily storing skis while not in use, relies on a rack and lock. The system comprises a rack configured to support pairs of skis leaned thereagainst. The rack, in turn, comprises a first tubular member formed to have a first leg portion extending upwardly from a first end positionable on a support surface to a first transverse portion spaced above the support surface. The first transverse portion extends to a second leg portion extending therefrom to a second end positionable on the support surface.

A second tubular member is formed to have a third leg portion extending upwardly from a third end positionable on a support surface to a second transverse portion spaced apart from the first transverse portion. The second transverse portion extends to a fourth leg extending therefrom to a fourth end positionable on the support surface.

A plurality of retainers is attached to the first transverse member and sized to effectively separate individual pairs of skis leaned against the first transverse member. The second transverse member may operate virtually identically to the first transverse member. A plurality of loops is secured to the first transverse member to separate adjacent pairs of skis and sized to receive a lock therethrough.

The lock comprises a frame sized to receive a pair of skis therein. A hasp is movably attached at one end to a first end of the frame and selectively attachable at another end to the second end of the frame. The hasp is sized with the frame to retain a pair of skis therebetween.

A locking mechanism is secured to the frame and operable to selectively secure and release the other end of the hasp with respect to the second end of the frame. A flexible member or tether is secured to the frame and operable to extend from the rack to the frame during use. The tether may be a chain. The chain is secured at a proximal end to the frame and at a distal end to the rack.

Alternatively, a ring is secured at the distal end of the chain, or other flexible member forming the tether, and sized to receive the hasp therethrough. The chain may be extendable to reach from the frame to the first transverse member and back to the hasp. In this configuration, the lock may be individually removable from the rack.

In operation, a user passes the ring at the distal end of the tether through a loop on the rack. The hasp is passed through the ring. Then, the frame is positioned around the skis and the hasp is closed around the skis. As the hasp locks into the frame, it captures the ring, forming two locks. The first lock is comprised of the frame and hasp and holds the skis. The second lock is comprised of the frame holding the tether at a proximal end thereof and the hasp holding the tether by the ring at the distal end. The first lock secures the skis to the frame and the second lock secures the frame to the rack.

With a rack that is moveable indoors or into a protected area at the end of each day, permanently attached locks become feasible, particularly where the rack is made of a strong metal such as steel. Moreover, permanently attached locks will not accumulate snow and ice to become inoperable, and may be serviced regularly.

BRIEF DESCRIPTION OF THE DRAWINGS

FIG. 5I is a cross-sectional top plan view of a portion of an alternate embodiment of the rack of FIG. 1;

FIG. 5J is an isometric exploded view of the attachment system for fastening the tubular members together;

FIG. 5K is a front end elevation view of the fastening system of FIG. 5I;

FIG. 5L is a rear sectioned view thereof;

FIG. 5M is a top plan cross-sectional view of a welded fastening system for the tubular members of FIG. 1;

FIG. 5N is a top plan cross-sectional view of a bolted fastening system for the tubular members of FIG. 1;

FIG. 6 is a right side elevation view of the transverse member of the rack of FIG. 2;

FIG. 7A is a right side elevation view of a segment of an alternate embodiment of a transverse member of the rack of FIG. 2;

FIG. 7B is a front end elevation cross-sectional view of the transverse member of FIG. 7A;

DETAILED DESCRIPTION OF THE EMBODIMENTS

Figure 1:
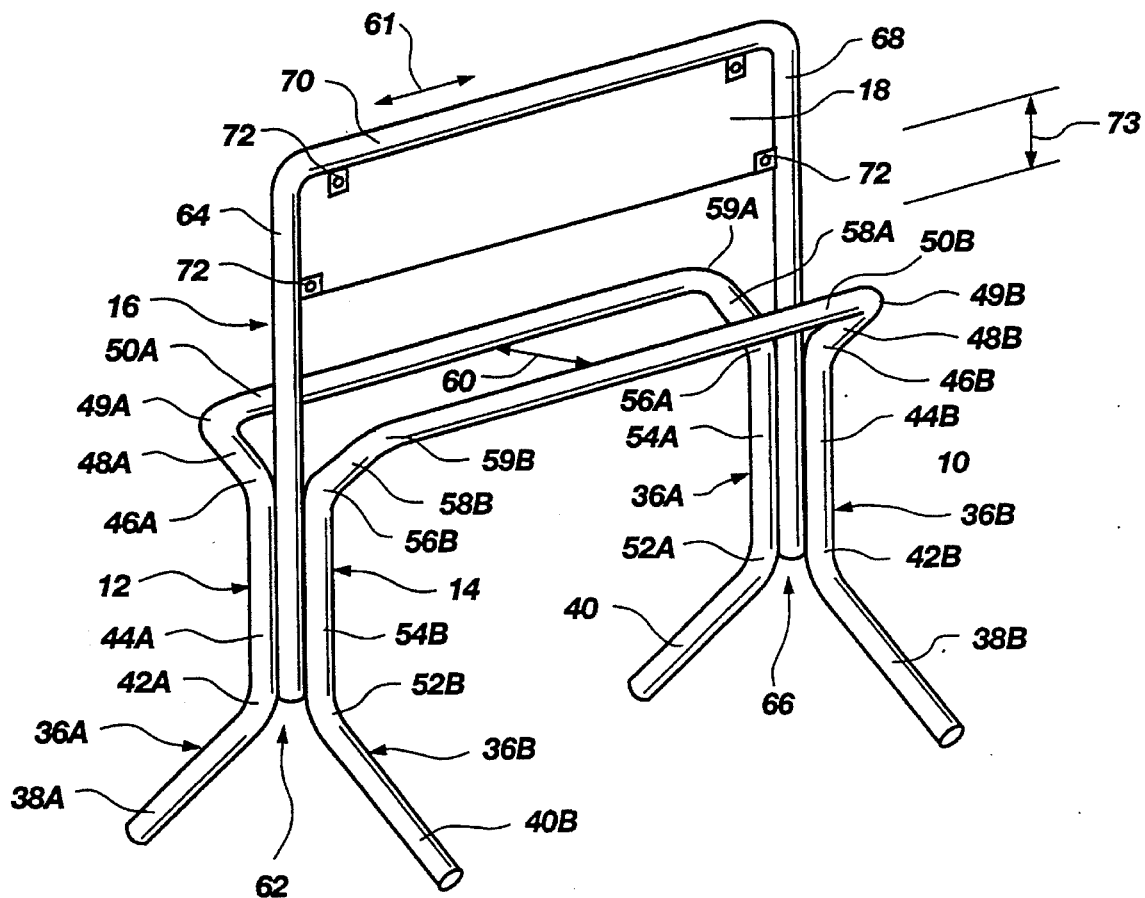
FIG. 1 is an isometric view of a rack of the invention having a display panel.

FIGS. 1–5H show the rack 10 formed of a first tubular member 12 joined to an identical tubular member 14. A standard 16 may be secured to be supported by the first tubular member 12 and second tubular member 14. A panel 18 or multiple panels 18 are supported by the standard 16. The panels 18 are configured to receive and display messages including instructions or advertising. A retainer 20 is secured to each of the first and second tubular members 12, 14 and includes a series of loops 22 formed therein.

For securing the skis of a user to the rack 10, a lock 24 is included in the system. The lock is best understood by reference to FIGS. 8–20. The lock is formed to have a frame 26 rotatably connected to a hasp 28. A tether 30 is preferably permanently attached to the frame 26 to be flexible and to extend away from the frame 26.

A catch 32 is constructed within the frame 26 for selectively securing the hasp 28 to the frame 26. An actuator 34 is also constructed within the frame 26 for actuating the catch 32 for releasing the hasp 28 to rotate freely with respect to the frame 26.

Returning to FIGS. 1–5H, the rack 10 may be configured in a variety of useful embodiments. The first tubular member 12 and second tubular member 14 are formed to have legs 36A, 36B and 37A, 37B rising from the feet 38A, 38B and 40A, 40B, respectively.

From the foot 38A, the first tubular member 12 rises to a lower knee 42A, an upright 44A, an upper knee 46A and an arm 48A before turning at an elbow 49A to form the beam 50A or transverse member 50B.

Similarly, the second tubular member 14 rises from the foot 40B positionable on an underlying support surface such as the ground or snowpack, to a lower knee 52B at which position the second tubular member 14 bends at the lower knee 52B to form the upright 54B extending to the upper knee 56B. The arm 58B extends from the upper knee 56B to an elbow 59B at which point the second tubular member 14 turns to become a beam 50B.

The beam 50A is separated from the beam 50B a distance 60 sized to form a yoke with the beams 50A, 50B which will fit on the shoulders of a user, the head of a user being placed between the beams 50A, 50B. The user may position the beams 50A, 50B in the longitudinal direction 61 to balance the rack 10 on the shoulders.

The standard 16 begins at an end 62 of the rack 10 where an upright 64 is captured between or otherwise proximate the first tubular member 12 and second tubular member 14. At the end 66 of the rack 10, an upright 68 is secured proximate the first and second tubular members 12, 14 and may be fastened therebetween. The uprights 64, 68 extend upwardly to join the beam 70 extending across the rack 10 in the direction 61. Brackets 72 or equivalents attach the panel 18 to the standard 16.

The panel 18 is spaced away from the beams 50A, 50B vertically a distance 73 to promote visibility of the panel 18 above skis stored on the rack 10. The distance 73 is also sized to facilitate carrying of the rack 10 by a user.

Figure 2:
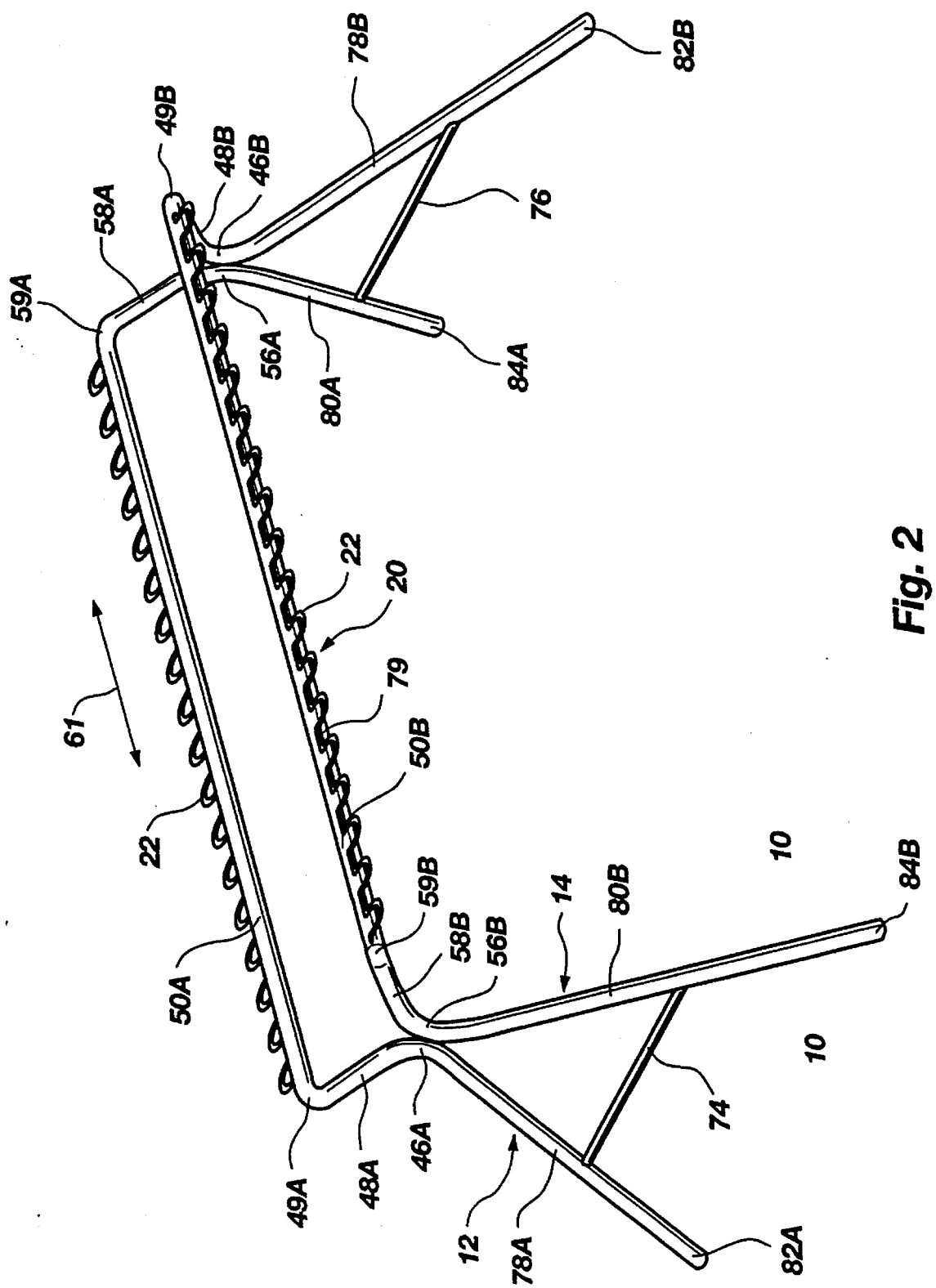
FIG. 2 is an isometric view of an alternate embodiment of the rack of the invention illustrating the loops of the retainers attached to the transverse members thereof.
Figure 3:
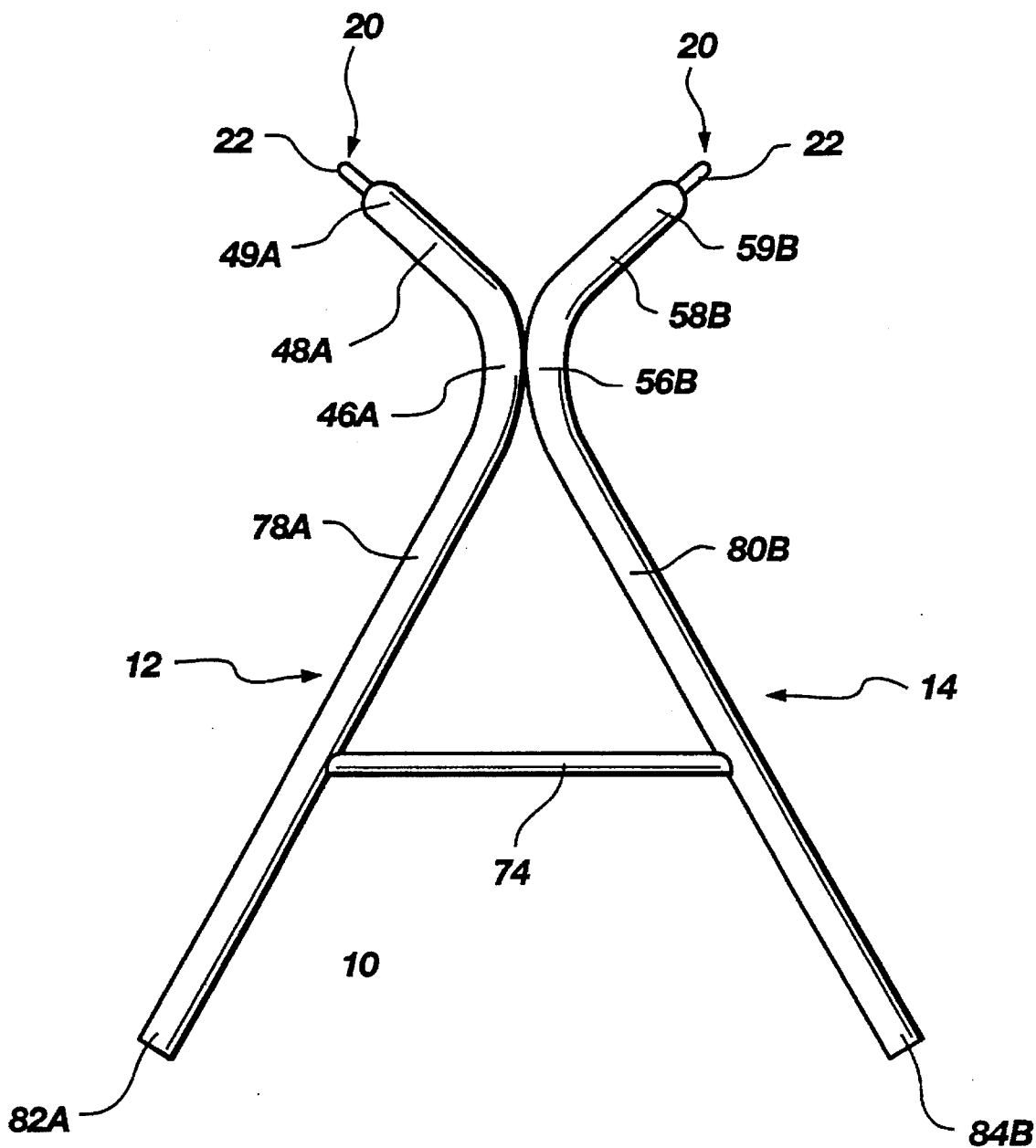
FIG. 3 is a front end elevation view of the rack of FIG. 2.
Figure 4:
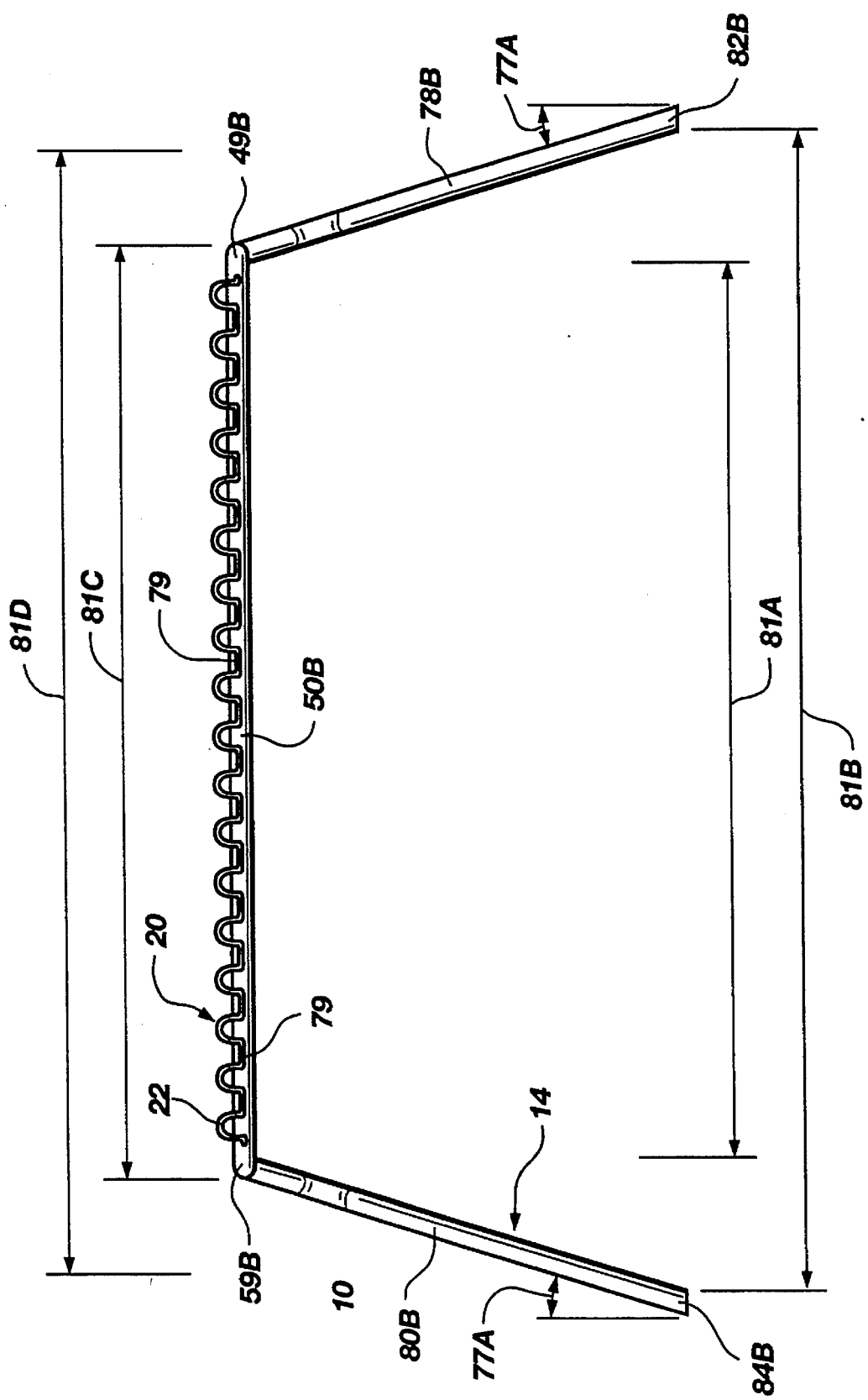
FIG. 4 is a right side elevation view of the rack of FIG. 2.

Braces 74, 76 extend between the legs 78, 80 of the first and second tubular members 12, 14, respectively, for stabilizing and strengthening the rack of FIGS. 2–4. The rack 10 is configured with the first tubular member 12 and second tubular member 14 to be formed of legs 78A, 80A and 78B, 80B, respectively extending from the feet 82A, 84A and feet 82B, 84B, respectively, to the upper knees 46A, 56A and 46B, 56B. From the upper knees 46A, 56A and 46B, 56B, the first and second tubular members 12, 14 extend to the arms 48A, 58A and 48B, 58B, respectively before curving at the elbows 49A, 59A and 49B, 59B, respectively, to extend along the beams 50A, 50B, respectively.

Along the longitudinal direction 61 of the rack 10, a retainer 20 is attached. The retainer 20 is formed to have straight portions 79 separated by loops 22. As illustrated in FIG. 4, the length 81A and the length 81B inside the rack 10 are formed to leave a taper or angle 77A in the legs 78A, 80A and 78B, 80B. These lengths 81A, 81B are sized to permit a rack 10 to be placed over another rack 10 in a stacking arrangement. That is, the lengths 81C, 81D outside a lower rack 10 are sized to accommodate the inside dimensional lengths 81A, 81B of an upper rack 10 stacked on the lower rack 10.

An additional utility for the rack 10 is illustrated in FIGS. 5A–5H. The standard 16 may be formed to have struts 86A, 88A connected at the corners 92A, 94A by an extension 90A, positioned thereabove. Likewise struts 86B and 88B are connected at the corners 92B, 94B by an extension 90B positioned therebetween and thereabove. Connected to be supported by the connections 90A, 90B is a frame 96 constructed to support and stabilize the panel 18.

Figure 5A:
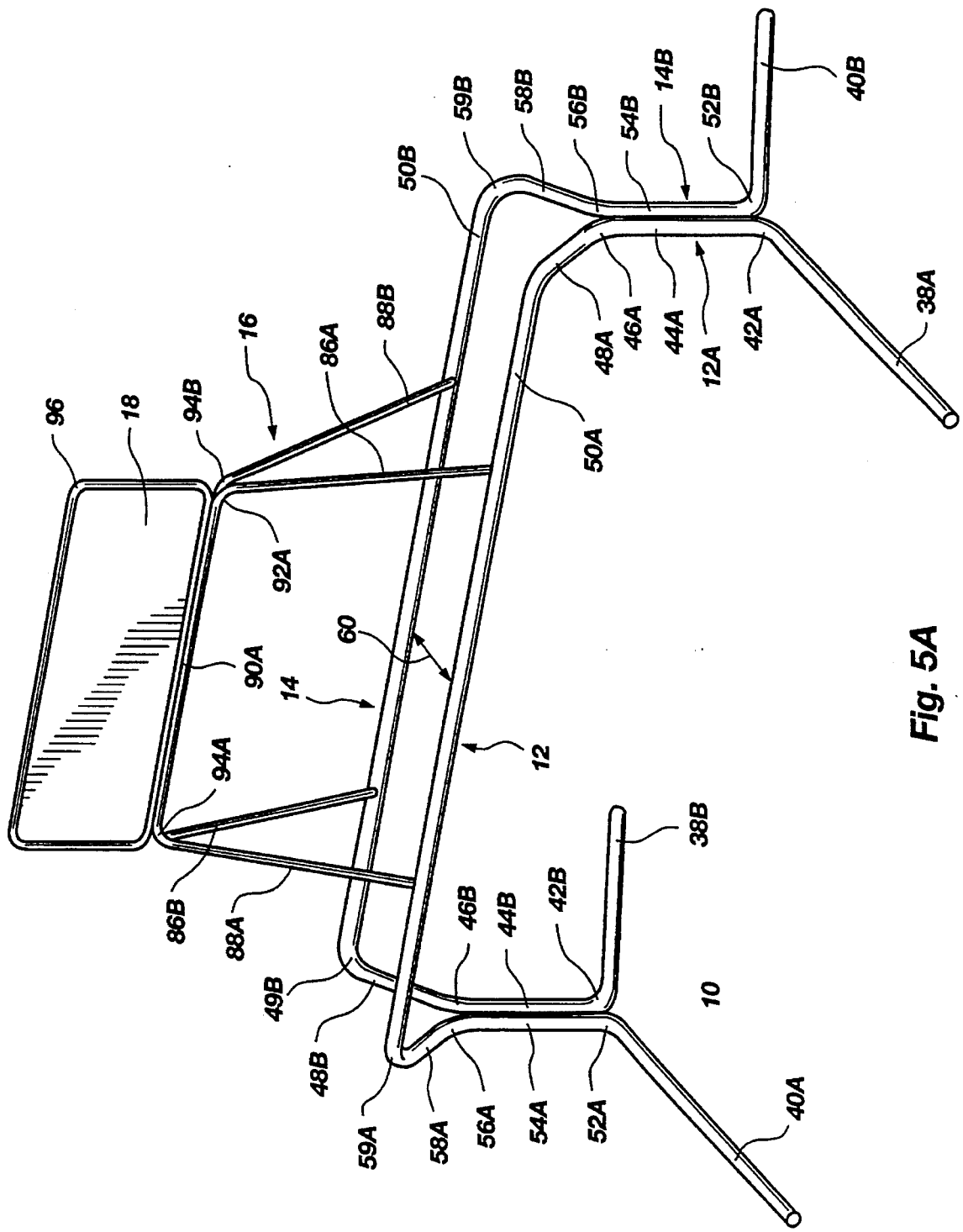
FIG. 5A is an isometric view of an alternate embodiment of the rack of FIG. 1.
Figure 5B:
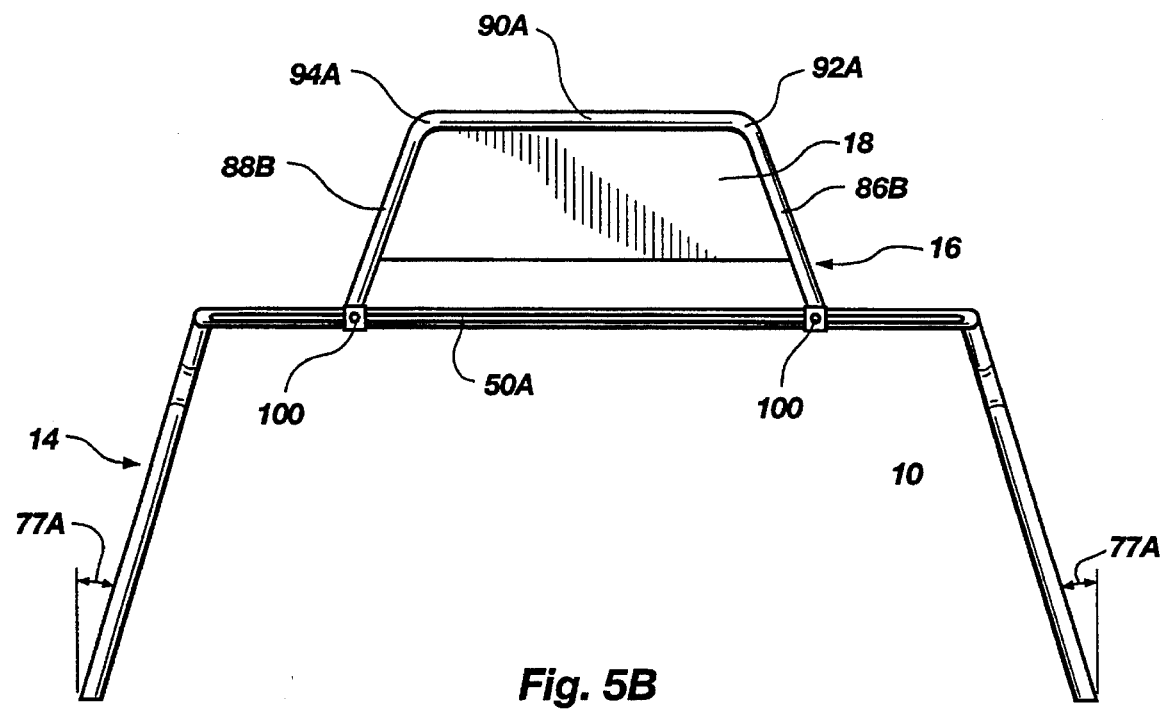
FIG. 5B is a side elevation view of one embodiment of the rack of the invention.

In an alternate embodiment, FIG. 5B illustrates a panel 18 positioned within the standard 16. Also, in the embodiment of FIG. 5B, the retainer 20 extends horizontally away from the beams 50A, 50B rather than the upwardly and outwardly extending retainer 20 as illustrated in FIGS. 2–4.

Figure 5C:
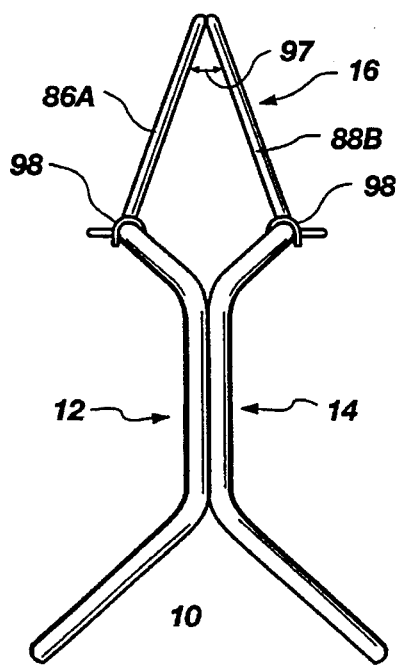
FIG. 5C is a front end elevation view of one embodiment of the rack of FIG. 5B corresponding to FIG. 1.
Figure 5D:
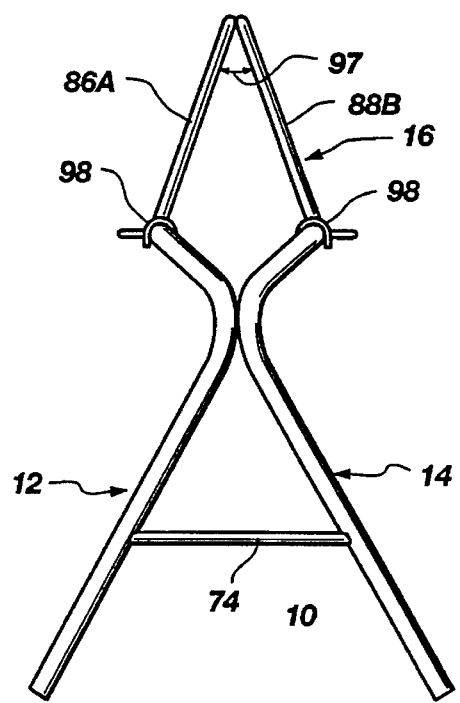
FIG. 5D is a front end elevation view of one embodiment of the rack of FIG. 5B corresponding to FIG. 3.
Figure 5E:
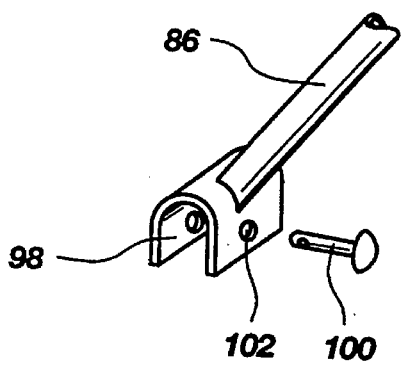
FIG. 5E is an isometric view of a detail of the bracket of FIGS. 5A–5D.
Figure 5F:
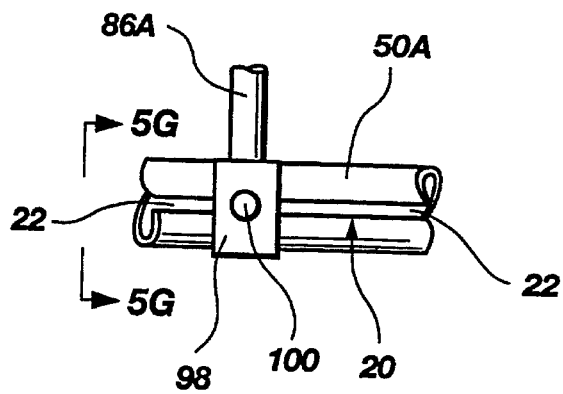
FIG. 5F is a left side elevation view of a portion of a transverse member from the rack of FIG. 5B.

As illustrated in FIGS. 5C, 5D, the standard 16 may be made removably securable to the first and second tubular members 12, 14. Although, the standard 16 might be semi-permanently attached or even permanently attached to the first and second tubular members 12, 14, the racks 10 would still be stackable when configured to have the angle 77A as well as the angle 97 between the struts 86A, 88A and the struts 86B, 88B. That is, the racks 10 may be stacked with the standard 16 in place.

Figure 5G:
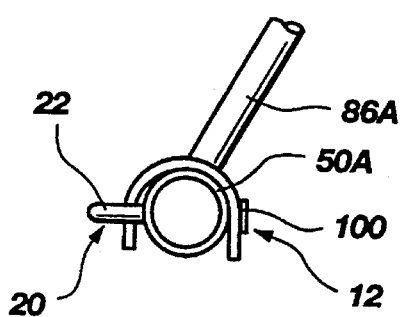
FIG. 5G is an cross-sectional front end elevation view of the transverse member of the rack of FIG. 5F taken at the section 5G—5G.
Figure 5H:
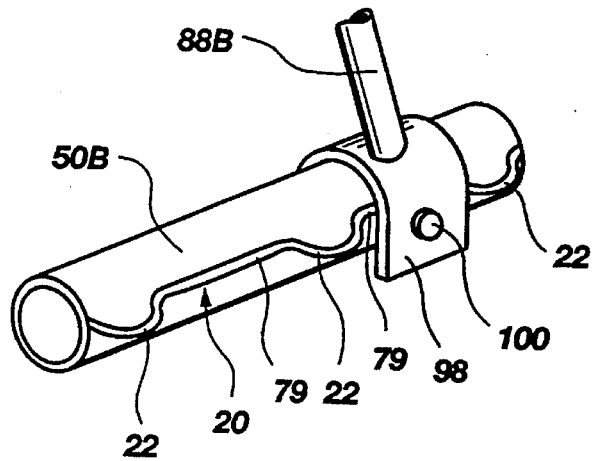
FIG. 5H is an isometric view of a section of a transverse member of FIG. 5B.

Nevertheless, as illustrated in FIGS. 5E–5H, a saddle or bracket 98 may be made removably attachable by a fastener 100 such as the clevis pin 100 shown, through the aperture 102. Thus, the bracket 98 may be made to fit over the retainer 20 as illustrated in FIGS. 5G–5H.

To reduce the weight of the rack 10, or to facilitate easier stacking of the racks 10, the standard 16 may be quickly and easily removed by releasing the fasteners 100 in the brackets 98 to permit the brackets 98 to be lifted off with the standard 16 from the beams 50A, 50B. In the absence of wind, the fasteners 100 may not be necessary. The racks 10 and standards 16 would move and stack separately.

Alternate embodiments for fastening means for connecting the first tubular member 12 to the second tubular member 14 is shown in FIGS. 5I–5N. FIG. 5I illustrates the first and second braces, 106A, 106B welded to the uprights 44A, 54B, respectively. The bolts 108 passing through apertures 112 and nuts 110 secure the first and second tubular members together.

The uprights 64, 68 of the standard 16 of FIG. 1 may be secured by the flange 114 bent to form a tang 116 for attachment of the uprights 64, 68. The flange 114 is sandwiched between the uprights 44A, 54A or may be bolted on beside one of them. The upright 68 is treated the same with respect to uprights 44B, 54A. The welding beads 118 of FIGS. 5I–5L are placed to facilitate complete separation of the first and second tubular members 12, 14 for shipping, and for storage at the end of the ski season. The braces 102A, 102B also stiffen and support the rack 10 significantly. FIG. 5M shows a method of welding the tubular members together with welding beads 118 directly, and with a long bolt 120.

The locking mechanism or lock 24 with its attachment to the beam 50B is illustrated in FIGS. 6–20. FIG. 6 illustrates the tether 30 embodied in the links 98 forming the chain 199. The chain 199 may be secured by a ring 200 permanently attached to the loop 22 of the retainer 20. In the alternative, the chain 199 may be threaded through the loop 22 as also illustrated.

In FIGS. 7A–7B, the retainer 20 is reduced to a mere loop 22 which may be welded, bolted, or inserted into apertures formed in the beam 50B to be welded. The configuration of FIGS. 7A–7B uses less material, but requires a different manufacturing process. Also, whereas the rod or filament 202 of FIG. 6, from which the retainer 20 and loops 22 are formed, forms a straight portion 79 which may be welded to the beam 50B, the loop 22 of FIG. 7A may be preformed and welded in place.

Also, the cross section of FIG. 7B illustrates a coating 205 applied to the beam 50B for additional weather protection. The coating 205 may be paint, galvanizing, hot dipped metal, polymer powder coding or a cathodic or anodic protection against corrosion. An additional benefit of the coating 205, particularly if it is a polymer material, is a lowered thermal conductivity, reducing the possibility of freezing a finger thereto.

The lock 24 of the system is illustrated in several embodiments of FIGS. 8–20. The lock 24 is comprised of a frame 26 attached, by a pin 206 which serves as a pivot 206, to the hasp 58.

The frame 26 is comprised of a first half 208 and a second half 210 which are sandwiched together about a core 211. Securely and permanently attached to the core 211 is an anchor 197.

The chain 199 is formed to extend from the anchor 197 to which the chain 199 is permanently attached, to the ring 200. In the embodiment of FIGS. 8–11, the chain 199, more generally, the tether 30, may be extended from the anchor 197 through the loop 22 of rack 10 and returned to be received over the hasp 28. Thus, when the hasp 28 is securely locked into the frame 26, the chain 199 and the hasp 28 may each be locked to a separate item. That is, the chain 199 is secured to the loop 22 of the rack while the hasp 24 is secured to the skis of a user.

A total length of about 12 inches is typical. A permanently anchored chain 199 with the ring 200 connected to the loop 22 need be only six inches long.

The first and second half 208, 210 are necessarily connected by means of fasteners 212 or equivalents.

The hasp 28 is preferably provided with teeth 214 which form a portion of the catch 32. The teeth 214 are preferably operable as part of a ratchet mechanism which operates to secure the hasp 28 against movement in the direction 215A while permitting free motion in the direction 215E. That is, a ratchetting mechanism permits motion with a minimal resistance in the direction 215B while providing an absolute mechanical stop to motion in the direction 215A. In one embodiment, a set of dials 216 operate an actuator 34 (not shown) inside the frame 26 for releasing the hold of the frame 26 on the teeth 214 of the catch 32.

Figure 8:
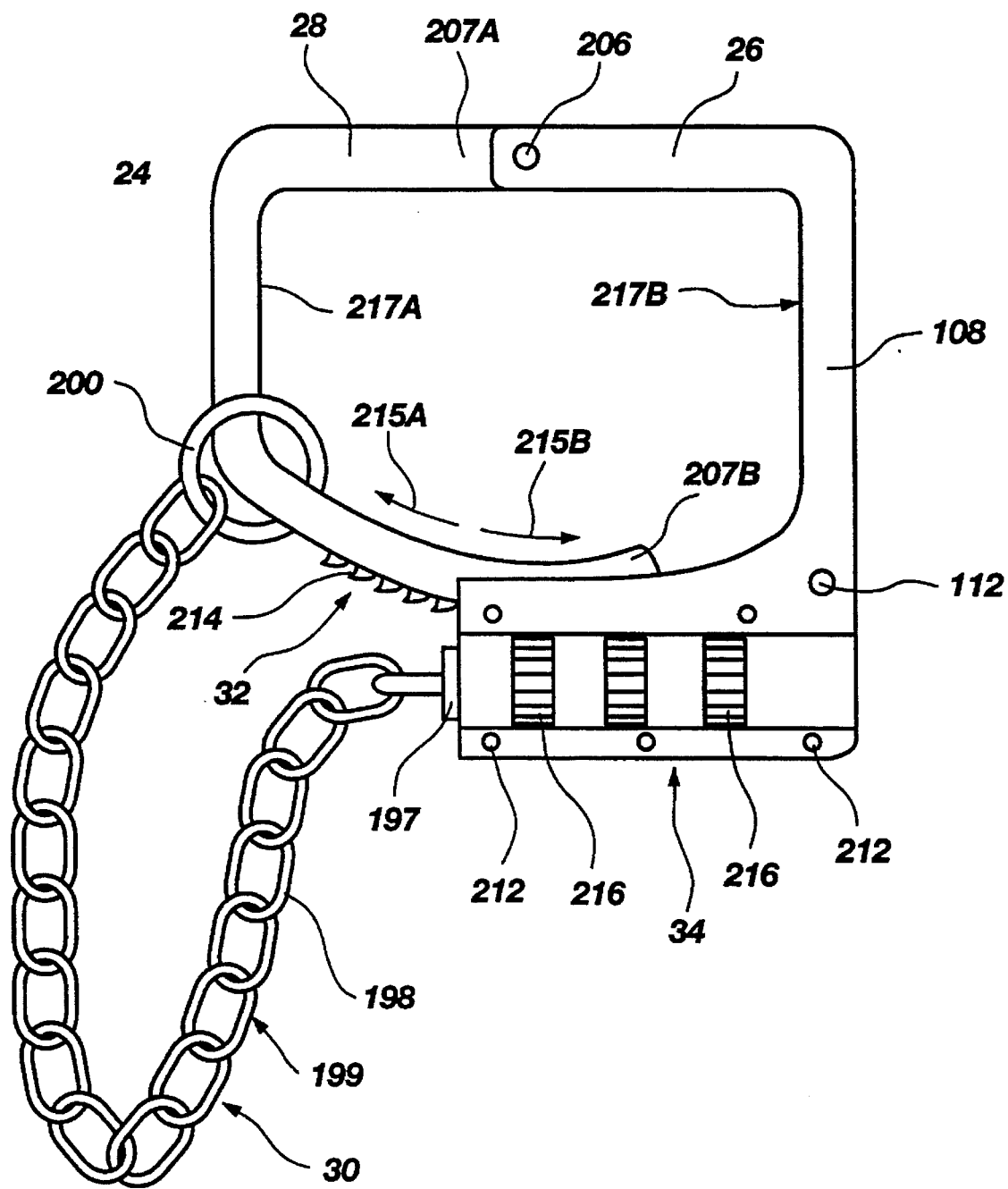
FIG. 8 is a front elevation view of a lock of the invention.
Figure 9:
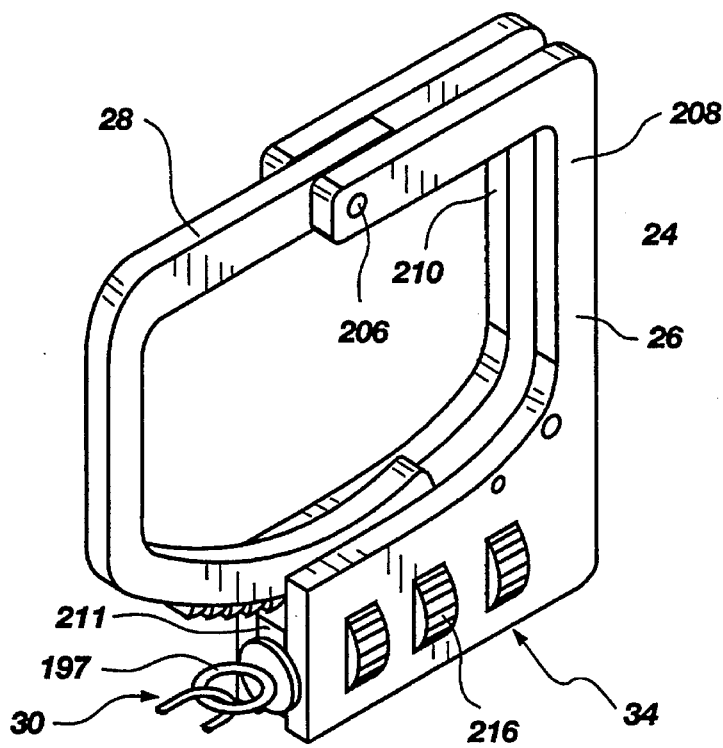
FIG. 9 is an isometric view of the lock of FIG. 8.
Figures 10, 11:
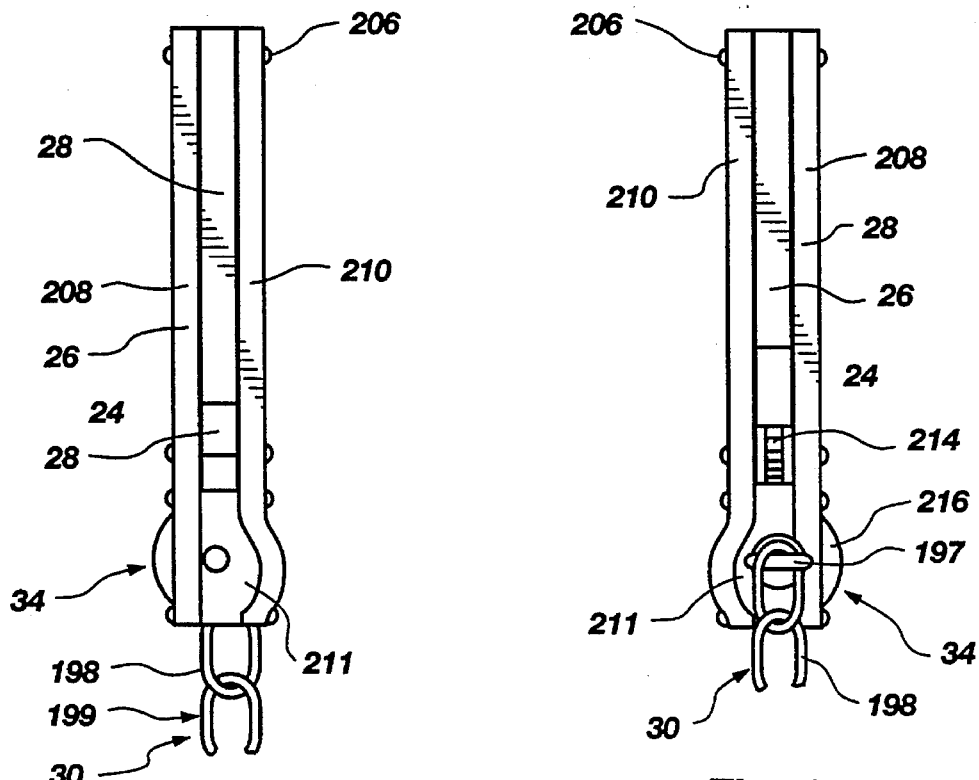
FIG. 10 is a right side elevation view of the lock of FIG. 8.
FIG. 11 is a left side elevation view of the lock of FIG. 8.
Figure 12:
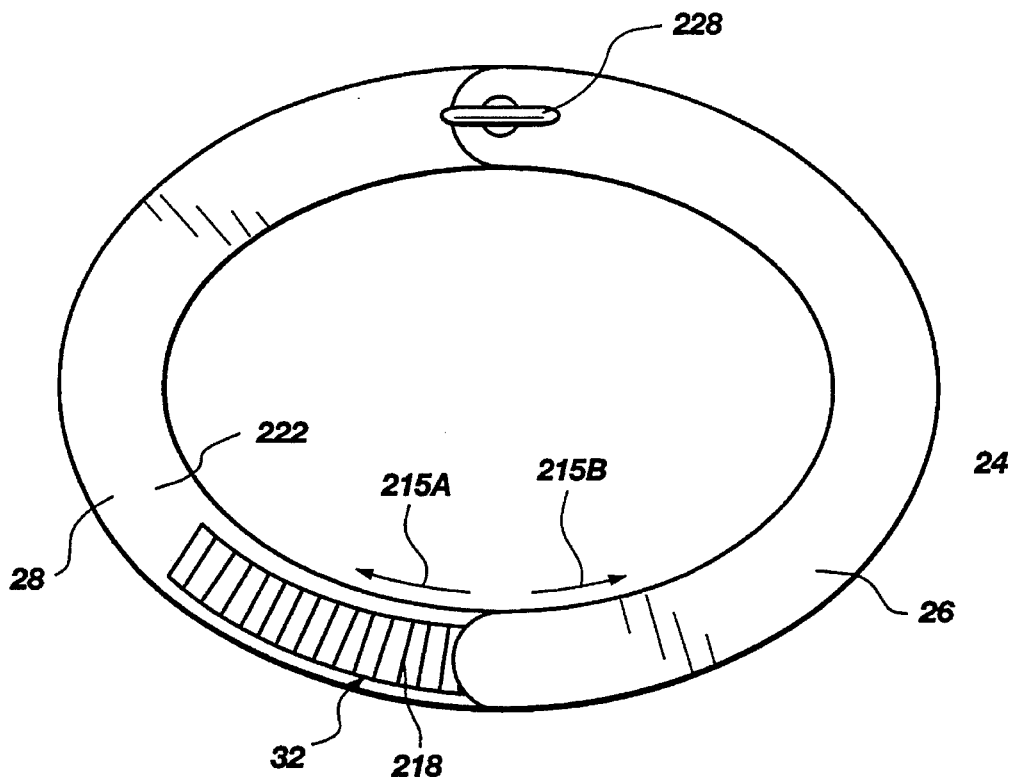
FIG. 12 is a front elevation view of an alternative embodiment of the lock of the invention.
Figure 13:
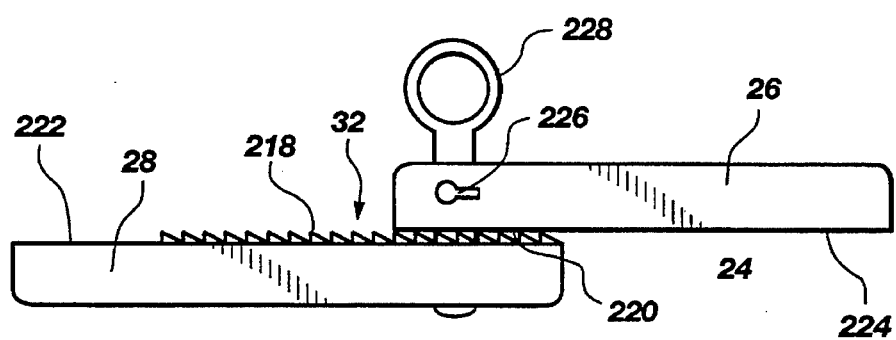
FIG. 13 is a bottom plan view of the lock of FIG. 12.
Figure 14:
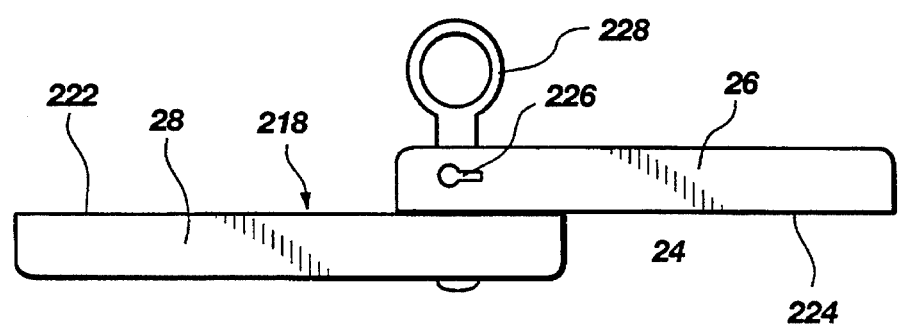
FIG. 14 is a bottom plan view of an alternate embodiment of the lock of FIG. 12.

The operation of the lock 24 of FIGS. 8–9 requires a user to operate the actuator 34 to release the hasp 28 to be movable in the direction 215A. In the alternative, if the ring 200 has not be stored over the hasp 28 while the lock 24 is not in use, then a user simply pushes the hasp in the direction 215B. The hasp 28, then rotates about the pin 206, passing completely through the frame 26 in a 180° arc.

The hasp 28 and the frame 26 have flat portions 217A, 217B respectively. The flat portions provide a snug fit against a user's pair of skis retained therebetween. Upon positioning of the hasp 28 in a fully open position, the user then places the skis into the frame 26 against the flat portion 217B. The waist of the ski may be positioned proximate the flat portion 217B or may be proximate the pin 206. Likewise, the top of an individual ski may be proximate the first end 207A or second end 207B of a hasp 28 as the hasp 28 is closed against the frame 26 to the position illustrated in FIG. 8.

Ski poles may be positioned in the space between the second end 207B of the hasp 28 and the surface of the skis in the embodiment of FIG. 9. However, skis may be oriented in each of the orientations discussed above, precluding ski poles in some cases.

An alternate embodiment of the lock 24 is illustrated in FIGS. 12–16 wherein the frame 26 and the hasp 28 are more nearly identical. The teeth 218 of the catch 32 are formed on the hasp 28 to be engaged by the teeth 220 formed in the frame 26 as part of the catch 32. The teeth 218 may be formed to extend above the face 222 of the hasp or below. Similarly, the teeth 220 may be formed to extend above the face 224 or to remain therebelow. Nevertheless, the teeth 218 should be positioned to be engageable by the teeth 220. That is, the teeth 218, 220 are mutually engageable and matingly fitted, but operate on a ratchetting principal similar to that of the embodiment of FIGS. 8–11.

Because the faces 222, 224 have a clearance therebetween, the hasp 28 may rotate more-or-less freely with respect to the frame 24 about the connecter pin 228 in the direction 215B. Nevertheless, the hasp 28 may not move freely in the direction 215A when the teeth 218, 220 are engaged.

Figure 15:
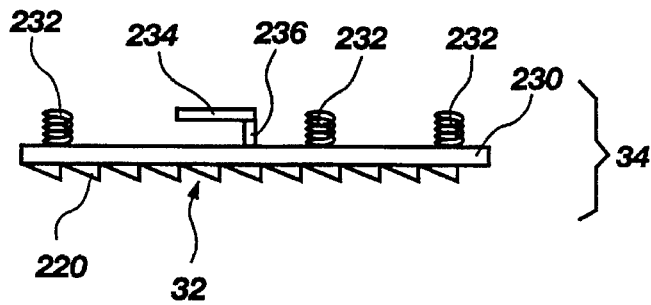
FIG. 15 is a bottom plan view of one embodiment of a catch mechanism (ratchet) for lock of FIG. 12.
Figure 16:
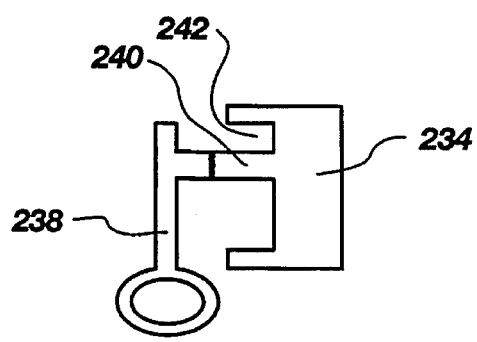
FIG. 16 is a front elevation view of a key engagement mechanism for the lock of FIG. 15.
Figure 17:
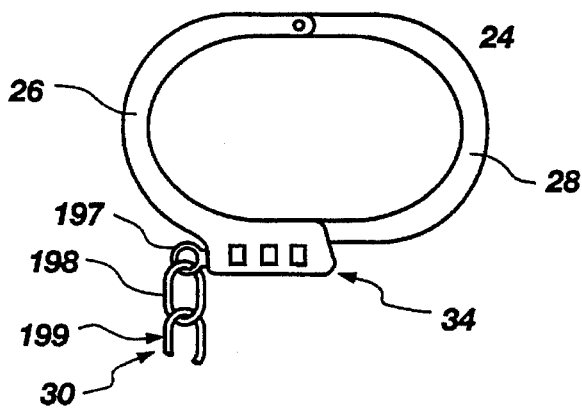
FIG. 17 is a front elevation view of an alternate embodiment of the lock of the invention in a locked position.

Although a number of mechanisms could be used to form the catch 32 and actuator 34, FIGS. 15–16 illustrate a simple engagement mechanism which can be positioned in the frame 26. A carrier 230 is positioned inside the frame 26 to be accessible through the keyhole 226. Springs 232 bias the carrier 230 downwardly toward the face 222 of the hasp 28. Thus, the teeth 220 of the catch 32 engage the teeth 218 on the hasp 28.

Actuation is accomplished when a tumbler 234 secured to the carrier 230 by a mount 236 is actuated by the key 238. That is, a system of unique bars 240 and slots 242 matching the shape of the key 238 may be actuated to lift the tumbler 234 releasing the engagement of the teeth 220, 218. A combination type mechanism such as is illustrated by the dials 216 of FIGS. 8–11 could also used in the embodiment of FIGS. 12–14. The teeth 220 should not be accessible to a person approaching the lock 24 in a closed position.

Figure 18:
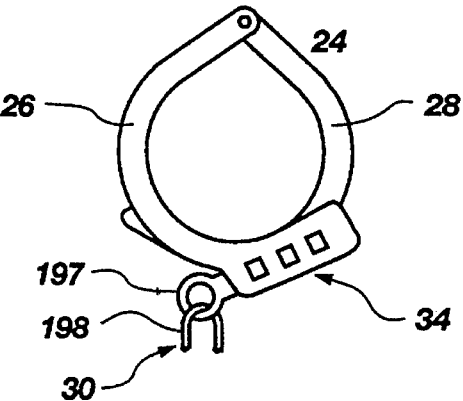
FIG. 18 is a front elevation view of the lock of FIG. 17 in a collapsed position.

FIGS. 17–20 illustrate alternative embodiments of the invention in which the frame 26 and hasp 28 are configured in an oval shape. That is, to facilitate locking ski poles inside the lock 24 with skis, it may be desirable under some circumstances to provide an additional space between the relatively rectangular shape of the skis and the shape of the lock 24. Also, as illustrated in FIG. 18, the hasp 28 may be ratchetted partially through the frame 26 to form a relatively smaller package for ease of carrying with no sharp corners, this embodiment is adaptable to be removable.

Figure 19:
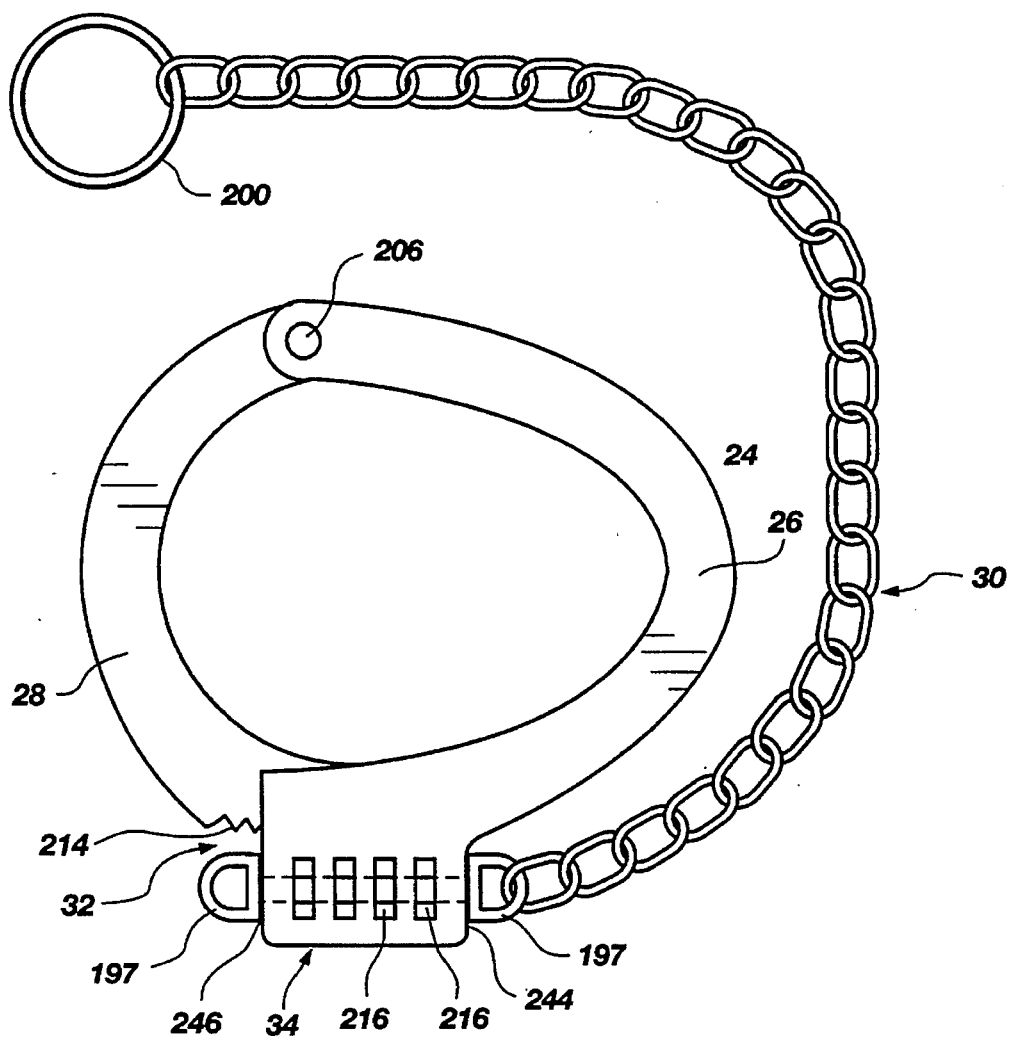
FIG. 19 is a front elevation view of an alternate embodiment of the lock of the invention.
Figure 20:
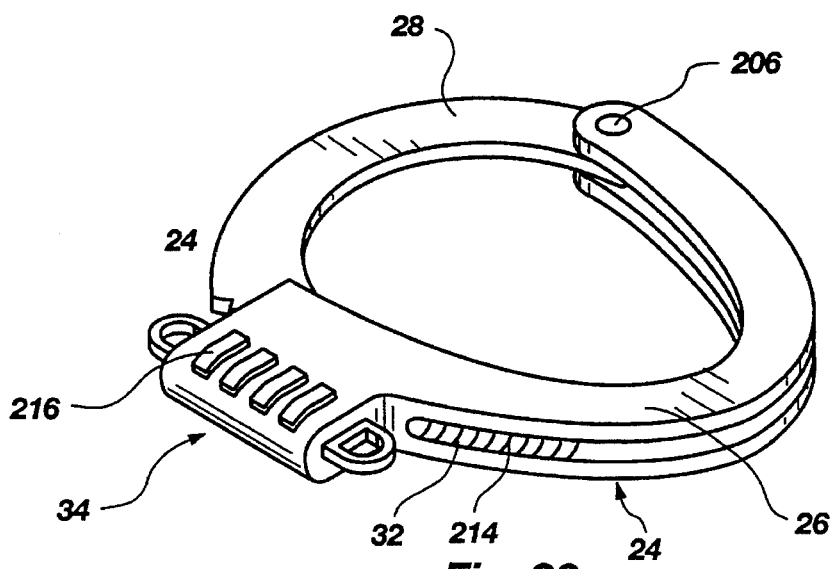
FIG. 20 is an isometric view of the lock of FIG. 19.

In FIGS. 19–20, the anchor 197 may be formed to create an axle (not shown) along which the dials 216 of a combination type mechanism (not shown) may be distributed. A compact configuration may result. Also, the anchor 197 may be formed to receive more than a single tether 30 or may be formed to receive the tether 30 at an end 244 opposite the end 24 of the anchor 197.

In the preferred embodiments, the lock 24 is a "pass-through" or a "pass-by" type. Thus, so long as the ring 200 in not stored on the hasp 28, a user may quickly apply the lock 24 to a pair of skis with a simple rotation of the hasp through or past the frame 24, appropriately, to an open position. Locking is completed by inserting the skis and closing the hasp 28 to a closed position with the teeth 214 firmly locked with respect to the core 211 and the portion of the catch 32 located thereby in the frame 26.

The ring 200 may be permanently attached to the rack 10. In the alternative, the lock 24 may be selectively attachable to the rack 10 by locking the ring 200 to the hasp 28 as illustrated in FIG. 8 and FIG. 6.

Various combinations of the embodiment may be formed using the features as disclosed herein. Obvious variations of the invention may be readily ascertainable by those skilled in the art, therefore the embodiments disclosed herein are by way of illustration and are not exhaustive or by way of limitation. The invention is thus limited only by the claims.

What is claimed is:

1. A rack for supporting skis while not in use, the rack comprising:

a first tubular member comprising:

a first leg formed to have a knee portion therein and having a proximal end positionable on a support surface, a first transverse member connected at one end to a distal end of the first leg, and a second leg formed to have a knee portion therein and having a proximal end positionable on a support surface and extending to connect at a distal end to another end of the first transverse member; and a second tubular member connected to the first tubular member and comprising:

a third leg formed to have a knee portion therein and having a proximal end positionable on a support surface, a second transverse member connected at one end to a distal end of the third leg, and a fourth leg formed to have a knee portion therein and having a proximal end positionable on a support surface and extending to connect at a distal end to another end of the second transverse member; and the first and second tubular members connected to position the first and second transverse members in spaced apart relation to form a yoke positionable on the shoulders of a user for carrying the rack.

2. The rack of claim 1 wherein the first and second tubular members are contoured for comfort and positionable to balance on the shoulders of a single user.

3. The rack of claim 1 wherein the first and second transverse members are each provided with retainers effective to separate pairs of skis leaned thereagainst and to receive a tether for securing the pairs of skis to the rack.

4. The rack of claim 3 wherein the retainers are further provided with loops for receiving therethrough the tether for locking, the tether being effective to secure a pair of skis against removal therefrom.

5. The rack of claim 1 wherein the first leg is fixed to the fourth leg and the second leg is fixed to the third leg.

6. The rack of claim 5 wherein the first leg is fastened at the knee portion thereof to the fourth leg at the knee portion thereof, and the second leg is fastened at the knee portion thereof to the third leg at the knee portion thereof.

7. The rack of claim 1 wherein the tubular members are formed of a lightweight material resistant to deterioration and sufficiently light to be carried conveniently by a single user.

8. The rack of claim 7 wherein the tubular members are formed of steel.

9. The rack of claim 8 further comprising a coating effective to resist deterioration in an outdoor environment.

10. A lock for securing a pair of skis to an anchor, the lock comprising:

a frame sized for receiving a pair of skis;

a hasp rotatably connected at one end to a first end of the frame to rotate freely in a first direction and sized with the frame to surround a pair of skis therebetween;

a tether connected to the frame at a proximal end and configured to extend away therefrom;

a ring sized to receive the hasp therethrough and secured at a distal end of the tether; and a catch secured to the frame to selectively engage another end of the hasp against movement in a direction opposite the first direction.

11. The lock of claim 10 wherein the tether is a chain.

12. The lock of claim 10 wherein the hasp is formed to pass through the frame in the first direction.

13. The lock of claim 10 wherein the hasp is formed to pass by the frame in the first direction.

14. The lock of claim 12 wherein the catch is a ratchet.

15. The lock of claim 14 wherein the ratchet is selectively releasable to permit movement in a second direction opposite the first direction.

16. A ski security system for temporarily storing skis while not in use, the system comprising:

a rack configured to support pairs of skis leaned thereagainst, said rack comprising:

a first tubular member formed to have a first leg portion extending upwardly from a first end positionable on a support surface to a first transverse portion spaced above said support surface, said first transverse portion extending to a second leg portion extending therefrom to a second end positionable on said support surface, a second tubular member formed to have a third leg portion extending upwardly from a third end positionable on a support surface to a second transverse portion spaced apart from the first transverse portion, the second transverse portion extending to a fourth leg extending therefrom to a fourth end positionable on the support surface, a plurality of retainers attached to the first transverse member and sized to effectively separate skis leaned against the first transverse member, a plurality of loops secured to the first transverse member and sized to receive a lock therethrough, a lock comprising:

a frame sized to receive a pair of skis therein, s hasp movably attached at one end to a first end of the frame and attachable at another end to the second end of the frame, the hasp being sized with the frame to retain a pair of skis therebetween, a locking mechanism secured to the frame and operable to selectively secure and release the other end of the hasp with respect to the second end of the frame, a flexible member secured to the frame and operable to extend at least twice the distance from the frame to the first transverse member, and a ring secured at a distal end of the flexible member and sized to receive the hasp therethrough.

17. A method of securing skis when not in use, the method comprising the steps of:

placing a pair of skis together with the bases thereof in contact;

positioning the pair of skis against a rack configured to support the pair of skis;

placing a lock comprising a hasp and frame, the hasp being rotatably connected at one end to the rigid frame and having a second end formed to be freely rotatable past the frame in one direction, around the waist of the pair of skis;

securing a tether attached at one end to the frame to the rack and connecting the tether at another end to the hasp; and securing the second end of the hasp to the frame to hold the pair of skis snugly between the hasp and the frame.

18. The method of claim 17 further comprising the step of releasing the lock by a releasing mechanism formed in the lock and unique thereto.

19. A rack for supporting skis while not in use, the rack comprising:

a first member comprising a first leg and a second leg with a first transverse member extending therebetween, the first and second legs each having a proximal end and a distal end with a knee portion therebetween, the first transverse member being connected to the distal ends of the first and second legs;

a second member comprising a third leg and a fourth leg with a second transverse member extending therebetween, the third and fourth legs each having a proximal end and a distal end with a knee portion therebetween, the second transverse member being connected to the distal ends of the third and fourth legs; and the first and second legs connected, respectively, to the third and fourth legs proximate the respective knee portions to position the first and second transverse members in spaced apart relation to form a yoke for carrying the rack on the shoulders of a user.

\* \* \* \* \*